United States Patent Office 3,517,024
Patented June 23, 1970

3,517,024
ANILINOALKYLTETRAZOLES
Ronald L. Buchanan, Fayetteville, and Richard A.
Partyka, Liverpool, N.Y., assignors to Bristol-Myers
Company, New York, N.Y., a corporation of Delaware
No Drawing. Filed June 7, 1966, Ser. No. 555,689
The portion of the term of the patent subsequent to
Aug. 22, 1984, has been disclaimed
Int. Cl. C07d 55/56
U.S. Cl. 260—308  12 Claims

ABSTRACT OF THE DISCLOSURE

Anilinoalkyltetrazoles of the formula

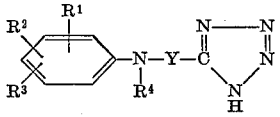

wherein $R^1$, $R^2$, $R^3$, $R^4$ and Y are described below possess hypocholesterolemic activity and are useful for lowering blood cholesterol level.

---

This invention relates to novel compounds. More particularly, this invention relates to novel compounds which possess valuable therapeutic utility as hypocholesterolemic agents and to processes useful in the preparation thereof.

It is an object of this invention to provide a new class of therapeutic compounds. It is another object of this invention to provide novel compounds having hypocholesterolemic activity. It is a further object of the present invention to provide a process for preparing the novel therapeutic compounds.

These and other objects which may appear as the specification proceeds are achieved by this invention which comprises the provision of compounds selected from the group consisting of compounds having the following formula

I

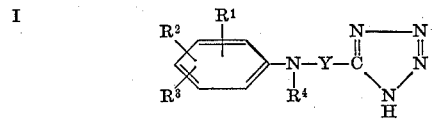

wherein $R^1$, $R^2$ and $R^3$ each represent a member selected from the group consisting of hydrogen, chloro, bromo, fluoro, iodo, trifluoromethyl, (lower)alkyl, (lower)alkoxy, (lower)alkylthio, di(lower)alkylamino, di(lower)alkyl-amino(lower)alkoxy, nitro, phenyl, phenoxy and benzyl, and $R^4$ is a member selected from the group consisting of hydrogen, (lower)alkyl and phenyl, and Y is (lower)alkylene, and the pharmaceutically acceptable nontoxic salts thereof.

The pharmaceutically acceptable nontoxic salts of the compounds of this invention include the nontoxic metallic salts such as sodium, potassium, calcium, aluminum and the like, the ammonium salt and substituted ammonium salts, e.g. salts of such nontoxic amines as trialkylamines, including triethylamine, procaine, dibenzylamine, N-benzyl-β-phenethylamine, 1-ephenamine, N,N-dibenzyl-ethylenediamine, dehydroabietylamine, N,N'-bisdehydro-abiethylethylenediamine, N-(lower)alkylpiperidine, e.g. N-ethylpiperidine, morpholine, dimethylamine, methylcyclo-hexylamine, glucosamine and other amines which have been used to form salts with benzylpenicillin. The salts of the compounds of this invention are prepared by conventional procedures described in the chemical literature.

The term "(lower)alkyl" as used herein means both straight and branched chain aliphatic hydrocarbon radicals having from 1 to 8 carbon atoms, e.g. methyl, ethyl, propyl, isopropyl, butyl, isobutyl, sec-butyl, t-butyl, amyl, 2-ethylhexyl, octyl, etc.

The term "(lower)alkylene" as used herein means both straight and branched chain alkylene radicals having from 1 to 8 carbon atoms, e.g. methylene, ethylene, propylene, isopropylene, butylene, isobutylene, t-butylene, amylene, hexylene, 2-ethylhexylene, methylmethylene, dimethyl-methylene, etc.

Similarly, where the term "(lower)" is used as part of the description of another group, e.g., (lower)alkoxy, it refers to the alkyl portion of such group which is therefore as described in connection with (lower)alkyl.

A preferred group of compounds of the present invention are those of Formula I wherein $R^1$, $R^2$ and $R^3$ each represent a member selected from the group consisting of hydrogen, chloro, bromo, fluoro, iodo, trifluoromethyl, (lower)alkyl, (lower)alkoxy and nitro.

The compounds of this invention have a high degree of hypocholesterolemic activity, making them potent hypocholesterolemic agents, and are useful for lowering serum cholesterol.

Hypocholesterolemic tests of the compounds of the present invention were carried out by administering the compounds (suspended in 0.5% carboxymethylcellulose solution) at a dose of 400 mg./kg. p.o. to rats once daily for 4 days. The control rats were treated similarly with the same volume dose of 0.5% carboxymethylcellulose only. Starting the evening of the fourth day, the rats were fasted. On the fifth day, the serum of the treated rats and control rats was analyzed for cholesterol, and the cholesterol content compared. The result is expressed as the percentage decrease in serum cholesterol.

In the test described above, a preferred compound of the present invention having the formula

II

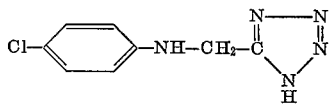

gave the following percentage decrease in serum cholesterol at the dosages in mgm./kg. given in parentheses: 13 (400), 7 (200), 2 (100). Thus, this compound is a very potent hypocholesterolemic agent.

The compounds of the present invention corresponding to Formula I are preferably prepared as exemplified below by reacting a nitrile of the formula

III

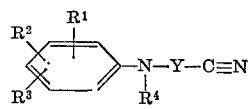

wherein $R^1$, $R^2$, $R^3$, $R^4$ and Y are as described above, with at least an equimolar weight of an azide and preferably an inorganic azide, e.g. sodium azide, lithium azide, tetramethylammonium azide, trimethylammonium azide, ammonium azide, aluminum azide, morpholinium azide, piperidinium azide or hydrazoic acid, in a liquid (and preferably anhydrous) medium for at least 12 hours at temperatures above room temperature and preferably in the range of about 80° C. to about 140° C. If desired, there may be added as a catalyst a Lewis acid, e.g. boron trifluoride-etherate, tetra-alkylammonium chlorides, aniline hydrochloride, ammonium chloride, lithium chloride. Suitable liquid media include the monomethyl and ethyl ethers of ethylene and diethylene glycol and tetrahydrofuran, n-butanol and particularly dimethyl sulfoxide and dimethylformamide. The azidic compound may be added per se or prepared in situ. In particular, use may be made of the procedures of U.S. Pats. 2,977,372, 3,155,666, 3,123,615 and those given by McManus et al., J. Org. Chem., 24, 1464 (1959); Finnegan et al., J. Amer. Chem. Soc., 80, 3908–3911 (1958); F. R. Benson, Chem. Rev., 41, 1 (1947); or in E. H. Rodd, Chemistry of Carbon Compounds, IV, 481–486, D. H. Van Nostrand Co. Inc., New York, N.Y. (1957); or in the references cited therein for the preparation of 5-substituted tetrazoles.

The nitriles of Formula III are compounds which are either commercially available, well known in the art, or easily prepared in accordance with standard organic procedures previously described in the chemical literature. For example, various nitriles are described by J. V. Braun and O. Kruber, Ber. 46, 3474 (1913), E. Knoevenagel, Ber. 37, 4084 (1904) and S. A. Heininger, J. Org. Chem. 22, 1213 (1957).

The nitriles of Formula III can be conveniently prepared by the following reaction schemes:

(a)
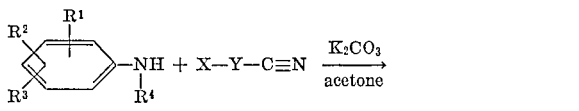

(b)
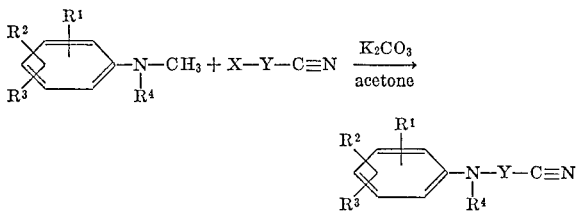

(c)
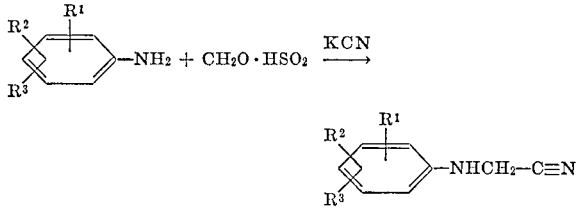

(d)
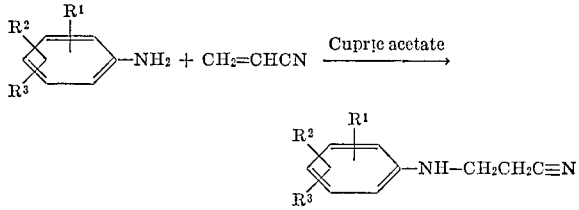

wherein $R^1$, $R^2$, $R^3$, $R^4$ and Y are as described above, and X is chloro, bromo or iodo.

Some of the compounds of the present invention contain an asymmetric carbon atom, and thus normally occur as a racemic mixture of the two optical isomers. Both isomers are active, and both of these isomers and mixtures thereof are included within the scope of the present invention. The individual isomers are prepared in pure form from a racemic mixture by resolution with an optically active amine, e.g. D-amphetamine, dehydroabietylamine, yohimbine, by the procedure used on other acids, e.g., α-phenoxypropionic acid.

The compounds of this invention are acidic and may be administered in their free form or in the form of their nontoxic salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compositions of this invention when administered orally or parenterally, in an effective amount, are effective in lowering serum cholesterol.

The following examples are intended to illustrate the invention described herein without unduly restricting it.

(A) PREPARATION OF INTERMEDIATES

Example A–1

Preparation of p-chloroanilinoacetonitrile

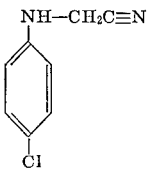

p-Chloroaniline (127.6 g., 1 mole) was added with stirring and heating on a boiling water bath to a mixture of 75 g. (1 mole) of 40% formaldehyde solution and 275 g. (1 mole) of 38% aqueous sodium bisulfite solution. About 400 ml. of water was added part way through the addition to keep the mixture fluid. A clear solution was obtained which was then cooled to about 45° C. Potassium cyanide (65.1 g., 1 mole) was then added portionwise with stirring, followed by heating on a water bath until the product separated as an oil. After cooling, the mixture was extracted with ether and the ether extracts were dried (Na₂SO₄) and the ether removed under reduced pressure. The resultant crude solid was recrystallized from ethyl acetate-"Skellysolve B" (petroleum solvent, B.P. 60–68° C., essentially n-hexane) giving 101.9 g. (61.2%) of the product, p-chloroanilinoacetonitrile, as off-white crystals, M.P. 67–68.5° C. A second recrystallization from ethyl acetate-"Skellysolve B" afforded an analytical sample, M.P. 66.5–68° C.

Example A–2

Preparation of anilinoacetonitrile

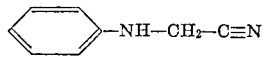

Aniline (93.1 g., 1 mole) was added dropwise and with stirring to a mixture of formaldehyde (75 g. of 40% solution, 1 mole) and sodium bisulfite (275 g. of 38% solution, 1 mole) which was heating on a steam bath. After the addition was complete, the mixture was allowed to cool to 60° C. and 350 ml. of water were added, followed by 65.1 g. (1 mole) of potassium cyanide. Heating on a steam bath was resumed for 2 hours. The mixture was cooled, extracted with 3 portions of ether and the ether extracts were washed with water and dried over anhydrous sodium sulfate. Removal of solvent and distillation of the remaining oil afforded 85.5 g. (64.7%) of anilinoacetonitrile, B.P. 130–140° C. at 0.35 to 0.5 mm. Reported by E. Knoevenagel, Ber. 27, 4081 (1904).

Example A–3

Preparation of m-chloroanilinoacetonitrile

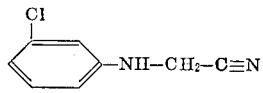

m-Chloroaniline (127.6 g., 1 mole) was added dropwise and with stirring to a mixture of formaldehyde (75 g. of 40% solution, 1 mole) and sodium bisulfite (275 g. of 38% solution, 1 mole) which was heating on a steam bath. After the addition was complete, the mixture was allowed to cool to 55° C. and 400 ml. of water were added, followed by 65.1 g. (1 mole) of potassium cyanide. Heating on a steam bath was resumed for 2.5 hours. The mixture was cooled, extracted with 3 portions of ether and the ether extracts were washed with water and dried over anhydrous sodium sulfate. Removal of solvent and vacuum distillation of the crude product gave 85.8 g. (51.5%) of m-chloroanilinoacetonitrile, B.P. 148–152° C. at 0.25 to 0.75 mm.

*Analysis.*—Calc'd. for $C_8H_7ClN_2$ (percent): C, 57.67; H, 4.23; Cl, 21.28; N, 16.82. Found (percent): C, 57.97; H, 3.98; Cl, 21.51; N, 16.48.

Example A–4

Preparation of p-methoxyanilinoacetonitrile

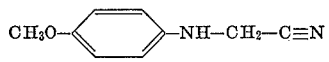

p-Methoxyaniline (anisidine) (104.5 g., 0.8482 mole) was added dropwise and with stirring to a mixture of formaldehyde (63.6 g. of 40% solution, 0.8482 mole) and sodium bisulfite (213.3 g. of 38% solution, 0.8482 mole) which was heating on a steam bath. After the addition was complete, the mixture was allowed to cool to 60° C. and 300 ml. of water were added, followed by 55.2 g. (0.8482 mole) of potassium cyanide. Heating on a steam bath was resumed for 3 hours. The mixture was cooled, extracted with 3 portions of chloroform and the chloroform extracts were washed with water and dried over anhydrous sodium sulfate. Removal of solvent gave a dark brown viscous oil.

Unreacted p-methoxyaniline was removed from the crude product by vacuum distillation. Decolorization in hot isopropyl alcohol followed by crystallization gave the product, p-methoxyanilinoacetonitrile, as brown crystals (103.8 g., 75.3%, M.P. 73–75° C.). Two further recrystallizations from isopropyl alcohol afforded an analytical sample (M.P. 75.5–78° C.).

*Analysis.*—Calc'd for $C_9H_{10}N_2O$ (percent): C, 66.65; H, 6.21; N, 17.27. Found (percent): C, 66.88; H, 6.23; N, 17.45.

Example A–5

Preparation of m-trifluoromethylanilinoacetonitrile

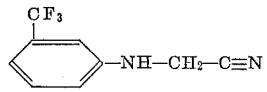

m-Trifluoromethylaniline (80.6 g., 0.5 mole) was added dropwise and with stirring to a mixture of formaldehyde (38 g., of 40% solution, 0.5 mole) and sodium bisulfite (52.05 g., 0.5 mole) dissolved in 136 g. of water which was heating on a steam bath. After the addition was complete, the mixture was allowed to cool to 60° C. and 175 ml. of water were added, followed by 32.55 g. (0.5 mole) of potassium cyanide. Heating on a steam bath was resumed for 2½ hours. The mixture was cooled, extracted with 3 portions of ether and the ether extracts were washed with water and dried over anhydrous magnesium sulfate. Removal of solvent and distillation of the remaining oil afforded 24.2 g. (46.5%) of m-trifluoromethylanilinoacetonitrile, B.P. 109–116° C. at 0.1 mm.

*Analysis.*—Calc'd for $C_9H_7F_3N_2$ (percent): C, 54.00; H, 3.53; N, 14.00. Found: (percent) C, 53.98; H, 3.66; N, 14.27.

Example A–6

Preparation of m-Nitroanilinoacetonitrile

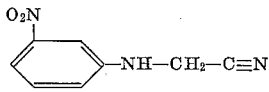

A solution of m-nitroaniline (138.2 g., 1 mole) in 200 ml. of dry dimethylformamide was added to a stirred and heated (steam bath) mixture of formaldehyde (75 g. of 40% solution, 1 mole) and sodium bisulfite (275 g. of 38% solution, 1 mole). After the addition was completed, 500 ml. of water was added and the heating was continued for 2 hours. After cooling to 65° C., potassium cyanide (65.2 g., 1 mole) was added and heating was resumed and continued for 3 hours. The mixture was then cooled, diluted with 1,000 ml. of water and extracted with ether and ethyl acetate. The combined extracts were washed with water, dried over anhydrous sodium sulfate and stripped of solvent. Recrystallization of the resultant solid from isoproyl alcohol-"Skellysolve B" afforded the product, m-nitroanilinoacetonitrile, (72.4 g., 40.8%) Recrystallization from chloroform afforded an analytical sample (M.P. 98–100° C.).

*Analysis.*—Calc'd for $C_8H_7N_3O_2$ (percent): C, 54.24; H, 3.98; N, 23.72. Found (percent): C, 53.99; H, 4.15; N, 23.92.

Example A–7

Preparation of α-(4-chloroanilino)propionitrile

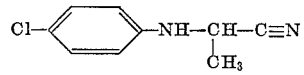

A mixture of 4-chloroaniline (0.1 mole), α-bromopropionitrile (4.1 mole), and anhydrous potassium carbonate (0.1 mole) in 50 ml. of dry acetone is refluxed for 8 hours. The mixture is then poured into 200 ml. of water containing 10 gm. of sodium hydroxide. Ether extraction followed by drying of the extracts with magnesium sulfate and removal of the solvent gives the product, α-(4-chloroanilino)propionitrile.

Example A–8

When, in the procedure of Example A–1, p-chloroaniline is replaced by an equal molar amount of 2-chloroaniline,
4-fluoroaniline,
4-trifluoromethylaniline,
4-phenylaniline,
2,6-dichloroaniline,
4-benzylaniline,
4-methylaniline,
3-methylaniline,
3-dimethylaminoethoxyaniline,
3-propylaniline,
2-iodoaniline,
2-trifluoromethylaniline,
3-ethoxyaniline,
4-dimethylaminoaniline,
3-diethylaminoaniline,
3-fluoroaniline,
3-bromoaniline,
3-phenoxyaniline,
4-methylthioaniline,
3-methylthioaniline,
2-chloro-4-methylaniline,
2,4-dichloroaniline,
2,4,6-tricholoroaniline
2-methoxyaniline,
3-methoxyaniline and
3,4-dichloroaniline,
there are obtained,
2-chloroanilinoacetonitrile,
4-fluoroanilinoacetonitrile,
4-trifluoromethylanilinoacetonitrile,
4-phenylanilinoacetonitrile,
2,6-dichloroanilinoacetonitrile,
4-benzylanilinoacetonitrile,
4-methylanilinoacetonitrile,
3-methylanilinoacetonitrile,
3-dimethylaminoethoxyanilinoacetonitrile,
3-propylanilinoacetonitrile,
2-iodoanilinoacetonitrile,
2-trifluoromethylanilinoacetonitrile,
3-ethoxyanilinoacetonitrile,
4-dimethylaminoanilinoacetonitrile,
3-diethylaminoanilionoacetonitrile,
3-fluoroanilinoacetonitrile,
3-bromoanilionoacetonitrile, 3-phenoxyanilinoacetonitrile,
4-methylthioanilinoacetonitrile,
3-methylthioanilinoacetonitrile,
2-chloro-4-methylanilinoacetonitrile,
2,4-dichloroanilinoacetonitrile,
2,4,6-tricholoroanilinoacetonitrile,
2-methoxyanilinoacetonitrile,
3-methoxyanilinoacetonitrile and
3,4-dichloroanilinoacetonitrile, respectively.

Example A-9

When, in the procedure of Example A-7, chloroacetonitrile is replaced by an equal molar amount of α-chloroisobutyronitrile,
β-chloropropionitrile,
γ-chlorobutyronitrile,
β-chlorobutyronitrile,
α-chlorobutyronitrile,
δ-chlorovaleronitrile,
γ-chlorovaleronitrile,
β-chlorovaleronitrile,
α-chlorovaleronitrile,
α-chloro-α-ethylbutyronitrile,
ʓ-chloroheptanonitrile and
ε-chlorohexanonitrile, there are obtained,
α-(4-chloroanilino)isobutyronitrile,
β-(4-chloroanilino)propionitrile,
γ-(4-chloroanilino)butyronitrile,
β-(4-chloroanilino)butyronitrile,
α-(4-chloroanilino)butyronitrile,
δ-(4-chloroanilino)valeronitrile,
γ-(4-chloroanilino)valeronitrile,
β-(4-chloroanilino)valeronitrile,
α-(4-chloroanilino)valeronitrile,
α-(4-chloroanilino)-α-ethylbutyronitrile,
ʓ-(4-chloroanilino)heptanonitrile and
ε-(4-chloroanilino)hexanonitrile, respectively.

Example A-10

When, in the procedure of Example A-7, 3-chloroaniline is replaced by an equal molar amount of N-methylaniline,
N-phenylaniline,
N-isopropylaniline,
3-chloro-N-methylaniline,
2-chloro-N-methylaniline,
4-chloro-N-methylaniline,
2-trifluoromethyl-N-methylaniline,
3-trifluoromethyl-N-methylaniline,
4-trifluoromethyl-N-methylaniline,
3-chloro-N-phenylaniline,
3-chloro-N-isopropylaniline,
3,4-dichloro-N-methylaniline,
3-bromo-N-methylaniline,
3-fluoro-N-methylaniline,
3-fluoro-N-phenylaniline,
3-trifluoromethyl-N-phenylaniline,
N-ethylaniline,
N-butylaniline,
4-methylthio-N-methylaniline,
2-iodo-N-methylaniline,
3-methyl-N-methylaniline,
4-phenyl-N-methylaniline,
4-phenoxy-N-ethylaniline,
4-benzyl-N-methylaniline,
4-diethylamino-N-methylaniline and
3-methoxy-N-methylaniline, there are obtained,
α-(N-methylanilino)propionitrile,
α-(N-phenylanilino)propionitrile,
α-(N-isopropylanilino)propionitrile,
α-(3-chloro-N-methylanilino)propionitrile,
α-(2-chloro-N-methylanilino)propionitrile,
α-(4-chloro-N-methylanilino)propionitrile,
α-(2-trifluoromethyl-N-methylanilino)propionitrile,
α-(3-trifluoromethyl-N-methylanilino)propionitrile,
α-(4-trifluoromethyl-N-methylanilino)propionitrile,
α-(3-chloro-N-phenylanilino)propionitrile,
α-(3-chloro-N-isopropylanilino)propionitrile,
α-(3,4-dichloro-N-methylanilino)propionitrile,
α-(3-bromo-N-methylanilino)propionitrile,
α-(3-fluoro-N-methylanilino)propionitrile,
α-(3-fluoro-N-phenylanilino)propionitrile,
α-(3-trifluoromethyl-N-phenylanilino)propionitrile,
α-(N-ethylanilino)propionitrile,
α-(N-butylanilino)propionitrile,
α-(4-methylthio-N-methylanilino)propionitrile,
α-(2-iodo-N-methylanilino)propionitrile,
α-(3-methyl-N-methylanilino)propionitrile,
α-(4-phenyl-N-methylanilino)propionitrile,
α-(4-phenoxy-N-ethylanilino)propionitrile,
α-(4-benzyl-N-methylanilino)propionitrile,
α-(4-diethylamino-N-methylanilino) propionitrile and
α-(3-methoxy-N-methylanilino)propionitrile, respectively.

Example A-11

When, in the procedure of Example A-7, α-bromopropionitrile is replaced by an equal molar amount of α-bromoacetonitrile and 3-chloroaniline is replaced by N-methylaniline,
N-phenylaniline,
N-isopropylaniline,
3-chloro-N-methylaniline,
2-chloro-N-methylaniline,
4-chloro-N-methylaniline,
2-trifluoromethyl-N-methylaniline,
3-trifluoromethyl-N-methylaniline,
4-trifluoromethyl-N-methylaniline,
3-chloro-N-phenylaniline,
3-chloro-N-isopropylaniline,
3,4-dichloro-N-methylaniline,
3-bromo-N-methylaniline,
3-fluoro-N-methylaniline,
3-fluoro-N-phenylaniline,
3-trifluoromethyl-N-phenylaniline,
N-ethylaniline,
N-butylaniline,
4-methylthio-N-methylaniline,
2-iodo-N-methylaniline,
3-methyl-N-methylaniline,
4-phenyl-N-methylaniline,
4-phenoxy-N-ethylaniline,
4-benzyl-N-methylaniline,
4-diethylamino-N-methylaniline and
3-methoxy-N-methylaniline, there are obtained,
N-methylanilinoacetonitrile,
N-phenylanilinoacetonitrile,
N-isopropylanilinoacetonitrile,
3-chloro-N-methylanilinoacetonitrile,
2-chloro-N-methylanilinoacetonitrile,
4-chloro-N-methylanilinoacetonitrile,
2-trifluoromethyl-N-methylanilinoacetonitrile,
3-trifluoromethyl-N-methylanilinoacetonitrile,
4-trifluoromethyl-N-methylanilinoacetonitrile,
3-chloro-N-phenylanilinoacetonitrile,
3-chloro-N-isopropylanilinoacetonitrile,
3,4-dichloro-N-methylanilinoacetonitrile,
3-bromo-N-methylanilinoacetonitrile,
3-fluoro-N-methylanilinoacetonitrile,
3-fluoro-N-phenylanilinoacetonitrile,
3-trifluoromethyl-N-phenylanilinoacetonitrile,
N-ethylanilinoacetonitrile,
N-butylanilinoacetonitrile,
4-methylthio-N-methylanilinoacetonitrile,
2-iodo-N-methylanilinoacetonitrile,
3-methyl-N-methylanilinoacetonitrile,
4-phenyl-N-methylanilinoacetonitrile,
4-phenoxy-N-ethylanilinoacetonitrile,
4-benzyl-N-methylanilinoacetonitrile,
4-diethylamino-N-methylanilinoacetonitrile and
3-methoxy-N-methylanilinoacetonitrile, respectively.

(B) PREPARATION OF PRODUCTS

Example B-1

Preparation of 5-(p-chloroanilinomethyl)tetrazole

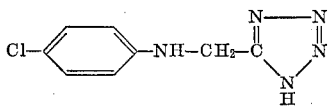

A mixture of p-chloroanilinoacetonitrile (24.99 g., 0.15 mole), sodium azide (10.7 g., 0.165 mole) and ammonium chloride (8.8 g., 0.165 mole) in 200 ml. of dimethylformamide was stirred at 100–110° C. for 16 hours. The dimethylformamide was removed under reduced pressure, and the residue was treated with cold water. The tetrazole precipitated and was filtered and dried, (20.0 g., 63.7%, M.P. 178–180° C.). Two recrystallizations from water gave the product, 5-(p-chloroanilinomethyl)tetrazole, M.P. 179.5–181° C.

*Analysis.*—Calc'd for $C_8H_8ClN_5$ (percent): C, 45.83; H, 3.85; Cl, 16.91; N, 33.41. Found (percent): C, 46.03; H, 3.95; Cl, 16.76; N, 33.57.

Example B-2

Preparation of 5-(anilinomethyl)tetrazole

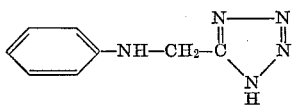

A mixture of anilinoacetonitrile (83.9 g., 0.635 mole), sodium azide (45.4 g., 0.698 mole) and ammonium chloride (37.3 g., 0.698 mole) in 400 ml. of dry dimethylformamide was stirred and heated at 115° C. for 17 hours. Most of the dimethylformamide was removed by evaporation in vacuo and the residue was suspended in water. The resulting mixture was extracted three times with a mixture of ether and ethyl acetate. The extracts were dried over anhydrous sodium sulfate and concentrated to give 72.1 g. (59%) of the crude product. The solid was dissolved in hot isopropyl alcohol, treated with decolorizing carbon and then twice recrystallized from isopropyl alcohol. The product, 5-(anilinomethyl)tetrazole, was obtained as an off-white solid, M.P. 150.5–153° C. (dec.).

*Analysis.*—Calc'd for $C_8H_9N_5$ (percent): C, 54.84; H, 5.18; N, 39.97. Found (percent): C, 55.08; H, 5.29; N, 40.16.

Example B-3

Preparation of 5-(m-chloroanilinomethyl)tetrazole

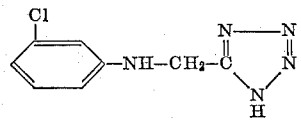

A mixture of m-chloroanilinoacetonitrile (41.7 g., 0.25 mole), sodium azide (17.9 g., 0.275 mole) and ammonium chloride (14.7 g., 0.275 mole) in 300 ml. of dry dimethylformamide were stirred and heated at 120° C. for 18 hours. The dimethylformamide was removed in vacuo and water was added to the residue. The suspension was extracted 3 times with ether and the ether extracts were washed with water and dried over anhydrous sodium sulfate. Removal of solvent gave 36.4 g. (51.1%) of crude crystalline product. Decolorization in isopropyl alcohol with charcoal and two recrystallizations from water gave the product, 5-(m-chloroanilinomethyl)tetrazole, as white crystals, M.P. 155–157° C.(dec.).

*Analysis.*—Calc'd for $C_8H_8ClN_5$ (percent): C, 45.83; H, 3.85; Cl, 16.91; N, 33.41. Found (percent): C, 46.01; H, 3.89; Cl, 16.73; N, 33.62.

Example B-4

Preparation of 5-(p-methoxyanilinomethyl)tetrazole

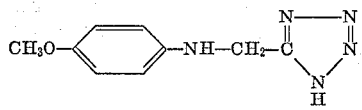

A mixture of p-methoxyanilinoacetonitrile (40.6 g., 0.25 mole), sodium azide (17.9 g., 0.275 mole) and ammonium chloride (14.7 g., 0.275 mole) in 300 ml. of dry dimethylformamide was stirred and heated at 100° C. for 19 hours. The bulk of the dimethylformamide was evaporated off in vacuo and the residue was suspended in water and extracted with ethyl acetate. After drying of the extracts (anhydrous sodium sulfate) and stripping of the solvent, the crude product was obtained as a dark brown crystalline solid (45.1 g., 83.8%). Decolorization in hot isopropyl alcohol followed by a single recrystallization from isopropyl alcohol and two recrystallizations from water gave the product, 5-(p-methoxyanilinomethyl)tetrazole, M.P. 135–138° C. (dec.).

*Analysis.*—Calc'd for $C_9H_{11}N_5O$ (percent): C, 52.67; H, 5.40; N, 34.13. Found (percent): C, 52.82; H, 5.40; N, 34.31.

Example B-5

Preparation of 5-(m-trifluoromethylanilinomethyl)tetrazole

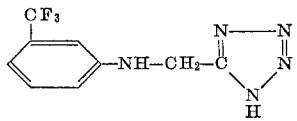

A mixture of m-trifluoromethylanilinoacetonitrile (22.2 g., 0.11 mole), sodium azide (8.46 g., 0.13 mole) and ammonium chloride (6.96 g., 0.13 mole) in 200 ml. of dry dimethylformamide was stirred and heated at 100–110° C. for 16 hours. The bulk of the dimethylformamide was stripped off in vacuo, the crude product was precipitated by the addition of dilute hydrochloric acid and recrystallized from isopropyl alcohol-water (21.5 g., 80.5%). The product, 5-(m-trifluoromethylanilinomethyl)tetrazole, was obtained after decolorization in hot isopropyl alcohol and recrystallization from isopropyl alcohol-water, M.P. 171–174° C. (dec.).

*Analysis.*—Calc'd for $C_9H_8F_3N_5$ (percent): C, 44.45; H, 3.32; N, 28.80. Found (percent): C, 44.26; H, 3.32; N, 29.04.

Example B-6

Preparation of 5-(m-nitroanilinomethyl)tetrazole

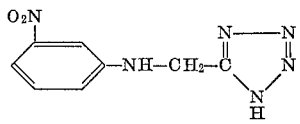

A mixture of m-nitroanilinoacetonitrile (14.2 g., 0.08 mole), sodium azide (5.8 g., 0.088 mole) and ammonium chloride (4.7 g., 0.088 mole) in 150 ml. of dry dimethylformamide was stirred and heated at 115° C. for 16 hours. Evaporation of the dimethylformamide under reduced pressure and addition of water to the residue afforded a crystalline solid. The solid was extracted into ethyl acetate and the solution was dried over anhydrous sodium sulfate. Removal of solvent and crystallization from isopropyl alcohol yielded the crude product (13.7 g., 77.8%). Two further recrystallizations from isopropyl alcohol afforded the product, 5-(m-nitroanilinomethyl)tetrazole, M.P. 157–159° C.

*Analysis.*—Calc'd for $C_8H_8N_6O_2$ (percent): C, 43.64; H, 3.66; N, 38.17. Found (percent): C, 43.51; H, 3.70; N, 38.28.

Example B-7

When, in the procedure of Example B-1, p-chloroanilinoacetonitrile is replaced by an equal molar amount of the product of Example A-7, there is obtained 1-(4-chloroanilino)-1-(5-tetrazolyl)ethane.

Example B-8

When, in the procedure of Example B-1, p-chloroanilinoacetonitrile is replaced by an equal molar amount of each of the products of Example A-8, there are obtained, 5-(2-chloroanilinomethyl)tetrazole,
5-(4-fluoroanilinomethyl)tetrazole,
5-(4-trifluoromethylanilinomethyl)tetrazole,
5-(4-phenylanilinomethyl)tetrazole,
5-(2,6-dichloroanilinomethyl)tetrazole,
5-(4-benzylanilinomethyl)tetrazole,
5-(4-methylanilinomethyl)tetrazole,
5-(3-methylanilinomethyl)tetrazole,
5-(3-dimethylaminoethoxyanilinomethyl)tetrazole,
5-(3-propylanilinomethyl)tetrazole,
5-(2-iodoanilinomethyl)tetrazole,
5-(2-trifluoromethylanilinomethyl)tetrazole,
5-(3-ethoxyanilinomethyl)tetrazole,
5-(4-dimethylaminoanilinomethyl)tetrazole,
5-(3-diethylaminoanilinomethyl)tetrazole,
5-(3-fluoroanilinomethyl)tetrazole,
5-(3-bromoanilinomethyl)tetrazole,
5-(3-phenoxyanilinomethyl)tetrazole,
5-(4-methylthioanilinomethyl)tetrazole,
5-(3-methylthioanilinomethyl)tetrazole,
5-(2-chloro-4-methylanilinomethyl)tetrazole,
5-(2,4-dichloroanilinomethyl)tetrazole,
5-(2,4,6-trichloroanilinomethyl)tetrazole,
5-(2-methoxyanilinomethyl)tetrazole,
5-(3-methoxyanilinomethyl)tetrazole and
5-(3,4-dichloroanilinomethyl)tetrazole, respectively.

Example B-9

When, in the procedure of Example B-1, p-chloroanilinoacetonitrile is replaced by an equal molar amount of the products of Example A-9, there are obtained, 2-(4-chloroanilino)-2-(5-tetrazolyl)propane,
1-(4-chloroanilino)-2-(5-tetrazolyl)ethane,
1-(4-chloroanilino)-3-(5-tetrazolyl)propane,
2-(4-chloroanilino)-1-(5-tetrazolyl)propane,
1-(4-chloroanilino)-1-(5-tetrazolyl)propane,
1-(4-chloroanilino)-4-(5-tetrazolyl)butane,
3-(4-chloroanilino)-1-(5-tetrazolyl)butane,
2-(4-chloroanilino)-1-(5-tetrazolyl)butane,
1-(4-chloroanilino)-1-(5-tetrazolyl)butane,
3-(4-chloroanilino)-3-(5-tetrazolyl)pentane,
1-(4-chloroanilino)-6-(5-tetrazolyl)heptane and
1-(4-chloroanilino)-5-(5-tetrazolyl)hexane, respectively.

Example B-10

When, in the procedure of Example B-1, p-chloroanilinoacetonitrile is replaced by an equal molar amount of each of the products of Example A-10, there are obtained, 1-(N-methylanilino)-1-(5-tetrazolyl)ethane,
1-(N-phenylanilino)-1-(5-tetrazolyl)ethane,
1-(N-isopropylanilino)-1-(5-tetrazolyl)ethane,
1-(3-chloro-N-methylanilino)-1-(5-tetrazolyl)ethane,
1-(2-chloro-N-methylanilino)-1-(5-tetrazolyl)ethane,
1-(4-chloro-N-methylanilino)-1-(5-tetrazolyl)ethane,
1-(2-trifluoromethyl-N-methylanilino)-1-(5-tetrazolyl)ethane,
1-(3-trifluoromethyl-N-methylanilino)-1-(5-tetrazolyl)ethane,
1-(4-trifluoromethyl-N-methylanilino)-1-(5-tetrazolyl)ethane,
1-(3-chloro-N-phenylanilino)-1-(5-tetrazolyl)ethane,
1-(3-chloro-N-isopropylanilino)-1-(5-tetrazolyl)ethane,
1-(3,4-dichloro-N-methylanilino)-1-(5-tetrazolyl)ethane,
1-(3-bromo-N-methylanilino)-1-(5-tetrazolyl)ethane,
1-(3-fluoro-N-methylanilino)-1-(5-tetrazolyl)ethane,
1-(3-fluoro-N-phenylanilino)-1-(5-tetrazolyl)ethane,
1-(3-trifluoromethyl-N-phenylanilino)-1-(5-tetrazolyl)ethane,
1-(N-ethylanilino)-1-(5-tetrazolyl)ethane,
1-(N-butylanilino)-1-(5-tetrazolyl)ethane,
1-(4-methylthio-N-methylanilino)-1-5-tetrazolyl)ethane,
1-(2-iodo-N-methylanilino)-1-(5-tetrazolyl)ethane,
1-(3-methyl-N-methylanilino)-1-(5-tetrazolyl)ethane
1-(4-phenyl-N-methylanilino)-1-(5-tetrazolyl)ethane,
1-(4-phenoxy-N-ethylanilino)-1-(5-tetrazolyl)ethane,
1-(4-benzyl-N-methylanilino)-1-(5-tetrazolyl)ethane,
1-(4-diethylamino-N-methylanilino)-1-(5-tetrazolyl)ethane and
1-(3-methoxy-N-methylanilino)-1-(5-tetrazolyl)ethane, respectively.

Example B-11

When, in the procedure of Example B-1, p-chloroanilinoacetonitrile is replaced by an equal molar amount of each of the products of Example A-11, there are obtained 5-(N-methylanilinomethyl)tetrazole,
5-(N-phenylanilinomethyl)tetrazole,
5-(N-isopropylanilinomethyl)tetrazole,
5-(3-chloro-N-methylanilinomethyl)tetrazole,
5-(2-chloro-N-methylanilinomethyl)tetrazole,
5-(4-chloro-N-metylanilinomethyl)tetrazole,
5-(2-trifluoromethyl-N-methylanilinomethyl)tetrazole,
5-(3-trifluoromethyl-N-methylanilinomethyl)tetrazole,
5-(4-trifluoromethyl-N-methylanilinomethyl)tetrazole.
5-(3-chloro-N-phenylanilinomethyl)tetrazole,
5-(3-chloro-N-isopropylanilinomethyl)tetrazole,
5-(3,4-dichloro-N-methylanilinomethyl)tetrazole,
5-(3-bromo-N-methylanilinomethyl)tetrazole,
5-(3-fluoro-N-methylanilinomethyl)tetrazole,
5-(3-fluoro-N-phenylanilinomethyl)tetrazole,
5-(3-trifluoromethyl-N-phenylanilinomethyl)tetrazole,
5-(N-ethylanilinomethyl)tetrazole,
5-(N-butylanilinomethyl)tetrazole,
5-(4-methylthio-N-methylanilinomethyl)tetrazole,
5-(2-iodo-N-methylanilinomethyl)tetrazole,
5-(3-methyl-N-methylanilinomethyl)tetrazole,
5-(4-phenyl-N-methylanilinomethyl)tetrazole,
5-(4-phenoxy-N-ethylanilinomethyl)tetrazole,
5-(4-benzyl-N-methylanilinomethyl)tetrazole,
5-(4-diethylamino-N-methylanilinomethyl)tetrazle, and
5-(3-methoxy - N - methylanilinomethyl)tetrazole, respectively.

While the present invention has been described and exemplified in terms of its preferred embodiment, those skilled in the art will appreciate that modifications can be made without departing from the spirit and scope of the invention.

What is claimed is:

1. A compound selected from the group consisting of compounds of the formula

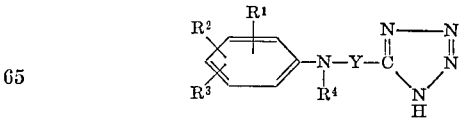

wherein $R^1$, $R^2$ and $R^3$ each represent a member selected from the group consisting of hydrogen, chloro, bromo, fluoro, iodo, trifluoromethyl, (lower)alkyl, (lower)alkoxy and nitro, $R^4$ is a member selected from the group consisting of hydrogen, (lower)alkyl and phenyl Y is (lower)alkylene, and the pharmaceutically acceptable nontoxic salts thereof.

2. A compound of claim 1 having the formula

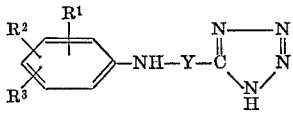

wherein $R^1$, $R^2$ and $R^3$ each represent a member selected from the group consisting of hydrogen, chloro, bromo, fluoro, iodo, trifluoromethyl, (lower)alkyl (lower)alkoxy, and nitro, and Y is (lower)alkylene.

3. The compound of claim 1 having the formula

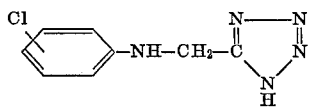

4. The compound of claim 1 having the formula

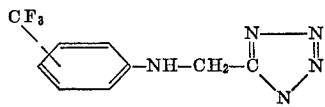

5. The compound of claim 1 having the formula

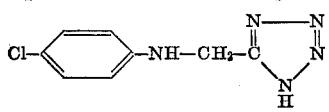

6. A pharmaceutically acceptable nontoxic salt of the compound of claim 5.

7. The compound of claim 1 having the formula

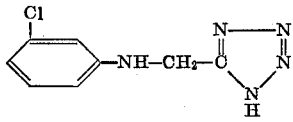

8. The compound of claim 1 having the formula

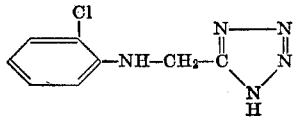

9. The compound of claim 1 having the formula

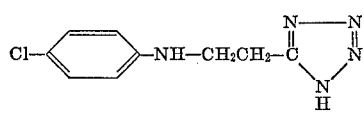

10. The compound of claim 1 having the formula

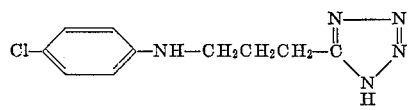

11. The compound of claim 1 having the formula

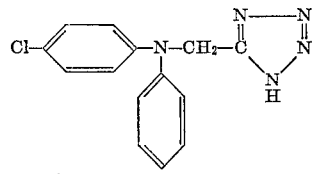

12. The compound of claim 1 having the formula

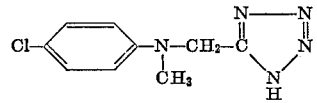

References Cited

UNITED STATES PATENTS

| | | | |
|---|---|---|---|
| 3,097,139 | 7/1963 | Thorp | 167—65 |
| 3,337,576 | 8/1967 | Buchanan | 260—308 |

OTHER REFERENCES

Burger, Medicinal Chemistry, (New York, 1960), pp. 77-78.

McManus et al., J. Org. Chem., vol. 24, pp. 1464-1467 (1959).

ALTON D. ROLLINS, Primary Examiner

U.S. Cl. X.R.

260—299, 293, 247.5, 465, 570.7, 571, 575, 578, 465.7, 577, 570; 424—269